United States Patent [19]

Kutch et al.

[11] 4,169,822

[45] Oct. 2, 1979

[54] HOT MELT SEALANTS

[75] Inventors: Edward F. Kutch, Trenton, N.J.; Robert M. Meyers, Fairless Hills, Pa.; Matthew M. Sitter, Convent Station, N.J.

[73] Assignee: The Norton Company, Worchester, Mass.

[21] Appl. No.: 796,561

[22] Filed: May 13, 1977

Related U.S. Application Data

[63] Continuation-in-part of Ser. No. 626,695, Oct. 29, 1975, and a continuation-in-part of Ser. No. 626,696, Oct. 29, 1975, which is a continuation-in-part of Ser. No. 460,332, Apr. 12, 1974, Pat. No. 3,932,341, which is a continuation of Ser. No. 256,928, May 25, 1972, abandoned.

[51] Int. Cl.$^2$ ............................................. C08L 93/00
[52] U.S. Cl. .................... 260/27 BB; 260/28.5 AS; 260/28.5 B; 260/30.6 R; 260/31.8 DR; 260/33.6 A; 260/33.6 AQ; 260/33.8 UA; 260/42.47; 525/92; 525/108; 525/109; 525/120; 525/121; 525/122
[58] Field of Search ............... 260/27 BB, 28.5 AS, 260/28.5 B, 31.8 DR, 33.6 A, 33.6 AQ, 33.8 UA, 30.6 R, 845, 848, 887, 901

[56] References Cited

U.S. PATENT DOCUMENTS

| | | | |
|---|---|---|---|
| 3,325,430 | 6/1967 | Grasley | 260/27 BB X |
| 3,500,603 | 3/1970 | Strack | 260/33.6 AQ X |
| 3,551,517 | 12/1970 | Dowbenko et al. | 260/33.6 UB |

*Primary Examiner*—Lewis T. Jacobs
*Attorney, Agent, or Firm*—Albert Sperry; Frederick A. Zoda; John J. Kane

[57] ABSTRACT

Solvent-free hot melt compositions for use as sealants, adhesives, caulking compounds or the like are produced by intimately blending elastomeric polymers with tackifying resins and plasticizers to obtain products having a hardness at room temperature of at least about 5 on the Shore A Durometer scale while being sufficiently soft at temperatures of about 150° F. or higher to permit them to be easily extruded or otherwise applied. Adhesion promoters, lubricants, fillers and the like are preferably added to the composition to improve the properties thereof. The products are characterized by their stability over a wide range of temperatures, their resistance to oxidation and weathering, and their low moisture vapor transmission properties.

10 Claims, No Drawings

HOT MELT SEALANTS

This application is a continuation-in-part of copending applications Ser. No. 626,696 and Ser. No. 626,695, both now abandoned, which are continuations in-part of application Ser. No. 460,332, now U.S. Pat. No. 3,932,341, which is a continuation of original application Ser. No. 256,928 filed May 25, 1972, now abandoned.

FIELD OF INVENTION

Many types of adhesives, sealants, caulking compositions and the like have been developed heretofore and are discussed at length in the book entitled "Sealants" by Adolfos Damusis published in 1967 by Reinhold Publishing Company. However, such compositions generally contain substantial amounts of volatile solvents which are often toxic or flammable and in any event are gradually released from the material resulting in delays in the operations in which they are employed and shrinkage of the material which is objectionable in many situations. Certain compositions of this type also contain curing or vulcanizing agents which interact to change the properties of the material over extended periods of time and do not lend themselves to rapid manufacturing operations.

Hot melt compositions are generally free of such objections in that they are soft or fluid at elevated temperatures but harden upon cooling without thereafter undergoing material change in volume or chemical or physical properties. While many of the polymers used in solvent and reaction type adhesives and sealants possess desirable properties, such as elasticity and moisture resistance, they have not been capable of use in hot melt compositions heretofore for the reason that they are not generally thermoplastic or workable in the absence of solvents or do not possess their desired properties until vulcanization or curing of the constituents thereof has taken place. Moreover, they do not possess adequate adhesive properties for many uses when in contact with glass or other substrates without the use of a priming coat first applied to such surfaces by a further operation. See for example, U.S. Pat. Nos. 2,903,437; 3,027,337; 3,340,224; 3,500,603; and 3,553,913.

In accordance with the present invention a wide variety of hot melt compositions adapted for use as adhesives, sealants, caulking compositions, expansion joints and the like are provided which are sufficiently soft or fluid at a temperature above about 150° F. to permit them to be readily applied in use and which harden upon cooling without solvent release or chemical reaction between constituents thereof.

These advantages are attained by providing compositions which in general consist of intimate mixtures of elastomeric polymers having a molecular weight of at least about 15,000 with plasticizing agents and tackifying resins. In most compositions adhesion promoters, lubricants and fillers are added to improve the properties of the hot melt compositions.

The hardness of the compositions at room temperature may vary from about 5 to 95 on a Shore A Durometer depending upon its formulation and the use for which the product is intended whereas they are all sufficiently soft at temperatures of about 150° F. to 375° F. to permit them to be readily applied by conventional equipment such as a heated caulking gun or the like.

Typical compositions embodying the present invention contain from about 10 to 100 parts by weight of one or more solid elastomeric polymers having a molecular weight of from about 15,000 up to 200,000 or 300,000 or more. Among such polymers and the trade names by which they are sometimes identified are, butyl rubbers such as the copolymers of isobutylene and isoprene (Ex 214 and PB201); polyisobutylene having a high molecular weight in the range below 150,000 (Vistonex MML140); butadienestyrene (Buna-S) and styrene-butadiene-styrene polymers (GRS and Kraton SBS) styrene-isoprene polymers (Kraton 1102); chlorinated rubbers (Parlon S125); acrylic rubber (Thiocryl); and urethane polyester rubbers (Elastothane 455) and solid polysulfide polymers (Thiokol FA and ST) which are reaction products of dihalogenated organic compounds and inorganic polysulfides.

The elastomeric polymers are intimately blended with tackifying resins and plasticizers in varying amounts depending upon the purpose for which the hot melt is to be employed. The amount of tackifying resins may range from about 1 to 400 parts for each 100 parts by weight of the elastomeric polymer employed whereas the amount of the plasticizer used may vary from about 15 to 600 parts to each 100 parts by weight of the elastomer used.

The tackifying resins preferred are terpene resins (Piccohesive 125); polyterpene resins (Wing Tack 95 and Foral 105); phenolic resins (SP559 and Super Beckocite 2000); hydrogenated rosin (Stabilite ester 10); and hydrocarbon resins (Nevillac 10 and ERJ 683). Typical plasticizers are polybutenes (Indopol 1900 and H-100); polyisobutylenes having a molecular weight not to exceed about 10,000; (Vistonex LMMS); phosphate esters (Santicizer 148); dibutyl phthalate; low temperature plasticizers such as straight chain aliphatic acid esters (TP90B, TP95, TP680); paraffin oils (Sun Par 2100); coal tars, asphalts; and Thiokol TP95 and T90B. Chlorinated polyphenyl (Aroclor 5460) and chlorinated biphenyl (Aroclor 1254) may be used for both their tackifying and plasticizing properties.

Adhesion promoters are incorporated in most compositions in amounts ranging from 0.5 to 60 parts by weight for each 100 parts by weight of the elastomer and are preferably selected from the group consisting of epoxy resins, organic silanes and mixtures thereof and urethane polyesters and polyethers. Typical adhesion promoters are epoxy resins having an epoxide equivalent of from 150 to 3000 such as the resins sold by Shell Chemical Company under the names Epon 1002 and 828. Among the organic silanes employed are those sold by Union Carbide Corporation which are vinyl, cyclic epoxy, aliphatic epoxy and methacryloxy silanes identified as A-186, A-187, A-153 and A-151. Other adhesion promoters which may be used are urethane polyesters and polyethers such as Solthane 291 and Guardthane 72, ethylene vinyl acetate sold by Union Carbide under the designation EVA and the phenolic resin known as Methylon 75108.

While certain of the constituents of the composition as herein described are referred to as "tackifyers," and "plasticizers" and "adhesion promoters," some of these agents are poly-functional in that they possess both tackifying and plasticizing or other properties or may improve the action of other agents in the composition by reason of their use in combination. Thus for example, the terpene resins often serve as plasticizers or improve the action of other plasticizers used in the mixture.

In most compositions it is desirable to use epoxy resin as the principal adhesion promoter but mixtures of epoxy resins with an organic silane often are found to be more effective, particularly when the hot metal composition is to be used in contact with glass. They serve in combination to improve the adhesive strength of the material. The silanes are particularly useful when the hot melt is applied to glass since it is then unnecessary to apply a priming layer to the glass prior to application of the hot melt. However, when a silane compound is used in combination with an epoxy resin, the compounds selected should be chosen so as to avoid chemical reaction therebetween. Thus amino silanes are not generally adapted for use in combination with epoxy resins in composition of the present invention.

Furthermore the use of organic silanes in combination with the epoxy resins improves the resistance to the action of water and ultra-violet light so as to increase its life and continued adhesion properties under adverse weather conditions.

From 5 to 1000 parts by weight of fillers based on each 100 parts of the elastomeric polymer may be used in producing the hot melt compositions of the present invention. Typical of such fillers are carbon blacks; calcium carbonate, talc, titanium dioxide, asbestos fibers, clay, silica, wood flour and the like.

In producing the compositions the constituents are intimately mixed and blended in a mill such as a Baker-Perkins Sigma Blade Mixer. Oridnarily the elastomer and tackifying resin are introduced first and when well blended the adhesion promoter and at least part of the filler is added and the plasticizer then introduced as the mixing operation is continued. The blending is effected by the shearing action of the mill and generally is carried out for about 30 to 60 minutes during which time the temperature rises to about 100° to 140° F., and preferably is kept below about 250° F. No chemical reaction takes place between the constituents of the composition during mixing thereof. The product is instead a simple, mechanical mixture of the ingredients.

When the elastomeric polymers used are Thiokol products such as the solid gum elastomers identified as FA and ST, they preferably are allowed to swell and soften by soaking in chlorinated biphenyl (Aroclor 1254) or dibutyl phthalate for some time before being introduced into the blender.

The proportions and selection of the elastomers, tackifyers, plasticizers and other ingredients employed can be varied depending on the particular properties desired in producing hot melt adhesives for use in the manufacture of shoes, box board, plywood, metal clad sheets and laminates, modular home, truck bodies, and motor vehicle parts, wall panelling and building elements. In addition, the compositions may also be compounded for use as caulking materials, expansion joints for roads, bridges and buildings, sealants for window and structural joints, back bedding for windows and for other purposes.

The following compositions are typical of those embodying the present invention in which the elastomeric polymer is a butadiene styrene or a styrene butadiene styrene polymer. The constituents are indicated in parts by weight:

| | | | | |
|---|---|---|---|---|
| Styrene Butadiene Styrene | 100 | — | 100 | 100 |
| Butadiene Styrene | — | 100 | — | — |
| Stearic Acid | 2 | 2 | 2 | 2 |
| Floral 105 | 100 | 100 | 75 | 75 |
| CaCo3 | 150 | 150 | 130 | 130 |
| Indepol H 1900 | 40 | 40 | 35 | 35 |
| Indepol H 100 | 20 | 20 | 20 | 20 |
| Epon 1007 | 20 | 20 | 20 | 20 |
| Silane | — | — | — | 1 |

The following compositions are typical of those embodying the present invention in which the elastomeric polymer is polyisobutylene. The constituents are expressed in parts by weight:

| | | | | | |
|---|---|---|---|---|---|
| Polyisobutylene | 100 | 100 | 100 | 100 | 100 |
| Wingtak 95 | 25 | — | 50 | 50 | 50 |
| CaCo3 | 50 | 50 | 50 | 50 | 50 |
| Super Beckocite 2000 | — | 50 | — | — | — |
| Carbon Black | 10 | 10 | 10 | 10 | 10 |
| Epon 1007 | 20 | 20 | 20 | — | 20 |
| Silane A186 | 1 | 1 | 1 | 2 | — |

All of the products described above are characterized by the fact that they are solvent-free and do not rely upon chemical reactions to cure or vulcanize the rubber or other elastomers of the blend. As a result they do not undergo shrinkage or material change in physical properties after cooling to room temperature following application. Moreover, they are easy and economical to produce and easy to handle using conventional equipment without delay or danger of fire or the need for special ventilation in the areas where they are employed.

In order to illustrate the improvement in adhesive properties resulting from the use of an epoxy resin in combination with an organic silane, as compared with the use of either agent alone, as the adhesion promoter in the styrene butadiene rubber compositions of the present invention the following tests are cited. The tests were conducted in accordance with "Intermm Federal Specification" TT-S-00230C (COM-NBS) Feb. 2, 1970 paragraphs 4.3.10 and 4.4.

| COMPOSITION | 1 | 2 | 3 | 4 |
|---|---|---|---|---|
| Styrene butadiene Rubber | 100 | 100 | 100 | 100 |
| Stearic acid | 2 | 2 | 2 | 2 |
| Floral 105 | 75 | 75 | 75 | 75 |
| Multiflex IDX | 130 | 130 | 130 | 130 |
| Indopol H100 | 20 | 20 | 20 | 20 |
| Indopol H1900 | 35 | 35 | 35 | 35 |
| Epon 1007 | — | 20 | 20 | — |
| Silane A186 | — | — | 1 | 2 |
| GLASS | | | | |
| Test Conditions | | | | |
| 7 days at 72° F. | AF | CF | CF | CF |
| 1 day 72° F., 14 days in water 72° F. | AF | SAF | CF | CF |
| 1 day 72° F., 14 days in water 125° F. | AF | CF | CF CF | |
| 1 day 72° F., 14 days water and U.V. | AF | CF | CF | CF |
| ALUMINUM | | | | |
| Test Conditions | AF | CF | CF | CF |
| 1 day 72° F.-14 days H2O 72° F. | AF | CF | CF | SAF |
| 1 day 72° F.-14 days H2O 125° F. | AF | CF | CF | SAF |

The symbol AF refers to "Adhesion Failure" indicating that the composition failed to bond effectively to the substrate under the test conditions. The symbol SAF indicates that there was a slight adhesion failure whereas the symbol CF indicates that "Cohesion Failure" occurred due to bonding of the composition to the substrates with sufficient tenacity to cause rupture of the composition itself upon separation of the substrates.

It will be evident that the composition containing no adhesion promoter failed in every test. Those compositions containing either epoxy resin or organic silane alone failed in some of the tests whereas those compositions containing a combination of epoxy resin and organic silane exhibited "Cohesion Failure" under all test conditions.

It will be apparent from the foregoing discussion and examples cited, that compositions embodying the present invention are capable of many modifications depending upon the particular attributes and physical properties desired for the various uses and applications of the hot melt compositions. In view thereof, it should be understood that the particular embodiments and formulations of the products cited are intended to be illustrative only and not intended to limit the scope of the invention.

We claim:

1. Solvent-free, hot-melt compositions adapted to be extruded for use as sealants, adhesives, caulking compounds, expansion joints and the like consisting essentially of an unreacted mechanical mixture of 100 parts by weight of a polymerized elastomeric compound having a molecular weight above about 15,000 and selected from the group consisting of polyisobutylene, butadiene-styrene, styrene-butadiene-styrene polymers, styrene-isoprene polymers, chlorinated rubbers, acrylic rubber and mixtures thereof, with from about 1 to 400 parts by weight of tackifying resins selected from the group consisting of terpene resins, polyterpene resins, phenolic resins, hydrogenated rosin, hydrocarbon resins and mixtures thereof; from about 15 to 600 parts by weight of plasticizers selected from the group consisting of polybutenes, low molecular weight polyisobutylenes, phosphate esters, dibutyl phthalate, straight chain aliphatic acid esters, paraffin oils, coal tars, asphalts, chlorinated polyphenyl, chlorinated biphenyl and mixtures thereof; from about 0.5 to 60 parts by weight of adhesion promoter comprising the combination of an eopxy resin and an organic silane which is non-reactive with the epoxy resin, and from about 5 to 1000 parts by weight of an inert filler material; said composition being readily extrudable at temperatures above about 150° F. while hardening upon cooling without undergoing chemical change, and having a hardness of about 5 to 95 on a Shore A Durometer at room temperature.

2. A hot melt composition as defined in claim 1 wherein the polymerized elastomeric compound is styrene butadiene rubber.

3. A hot melt composition as defined in claim 1 wherein the polymerized elastomeric compound is polyisobutylene.

4. A hot melt composision as defined in claim 1 wherein the polymerized elastomeric compound is styrene butadiene rubber and the adhesion promoter consists of the combination of an epoxy resin with an organic silane and is present in an amount equal to about 20% by weight of the weight of the styrene butadiene rubber.

5. A hot melt composition as defined in claim 1 wherein the polymerized elastomeric compound is polyisobutylene and the adhesion promoter consists of the combination of an epoxy resin with an organic silane and is present in the amount of about 20% by weight of the weight of the polyisobutylene.

6. A hot melt composition as defined in claim 1 wherein the epoxy resin has an epoxy equivalent of from about 150 to 3000 and is non-reactive with the organic silane.

7. Solvent-free, hot-melt compositions adapted to be extruded for use as sealants, adhesives, caulking compounds, expansion joints and the like consisting essentially of an unreacted mechanical mixture of 100 parts by weight of elastomeric polyisobutylene having a molecular weight above about 15,000, with from about 1 to 400 parts by weight of tackifying resin selected from the group consisting of terpene resins, polyterpene resins, phenolic resins, hydrogenated rosin, hydrocarbon resins and mixtures thereof; from about 15 to 600 parts by weight of plasticizer selected from the group consisting of polybutenes, low molecular weight polyisobutylenes, phosphate esters, dibutyl phthalate, straight chain aliphatic acid esters, paraffin oils, coal tars, asphalts, chlorinated polyphenyl, chlorinated biphenyl, and mixtures thereof; from about 0.5 to 60 parts by weight of adhesion promoter comprising the combination of an epoxy resin having an epoxide equivalent of from about 150 to 3000 and an organic silane which is non-reactive with the epoxy resin; and from about 5 to 1000 parts by weight of an inert filler material; said composition being readily extrudable at temperatures above 150° F. while hardening upon cooling without undergoing chemical change, and having a hardness of about 5 to 94 on a Shore A Durometer at room temperature.

8. A solvent-free hot melt composition adapted to be used as a sealant, caulking compound, expansion joint or the like consisting essentially of an unreacted mechanical mixture having approximately the following composition in parts by weight:

| | |
|---|---|
| Polyisobutylene, having a molecular weight above about 15,000 | 100 |
| Polyterpene resin | 25 |
| Calcium carbonate | 50 |
| Carbon black | 10 |
| Epoxy resin | 20 |
| Organic silane, which is non-reactive with epoxy resins | 1 | said composition being readily extrudable at temperatures above about 150° F., while hardening upon cooling without undergoing chemical change, and having a hardness of about 5 to 94 on a Shore A Durometer at room temperature.

9. A solvent-free hot melt composition adapted to be used as a sealant, caulking compound, expansion joint or the like consisting essentially of an unreacted mechanical mixture having approximately the following composition in parts by weight:

| | |
|---|---|
| Polyisobutylene, having a molecular weight above about 15,000 | 100 |
| Calcium carbonate | 50 |
| Phenolic resin | 50 |
| Carbon black | 10 |
| Epoxy resin | 20 |
| Organic silane, which is non-reactive with epoxy resins | 1 | said composition being readily extrudable at temperatures above about 150° F., while hardening upon cooling without undergoing chemical change and having a hardness of about 5 to 94 on a Shore A Durometer at room temperature.

10. A solvent-free hot melt composition adapted to be used as a sealant, caulking compound, expansion joint or the like consisting essentially of an unreacted mechanical mixture having approximately the following composition in parts by weight:

| | |
|---|---|
| Polyisobutylene, having a molecular weight above about 15,000 | 100 |
| Polyterpene | 50 |
| Calcium carbonate | 50 |
| Carbon black | 10 |
| Epoxy resin | 20 |
| Organic silane, which is non-reactive with epoxy resins | 1 | said composition being readily extrudable at temperatures above about 150° F., while hardening upon cooling without undergoing chemical change, and having a hardness of about 5 to 94 on a Shore A Durometer at room temperature.

* * * * *